(12) United States Patent
Gulen et al.

(10) Patent No.: US 8,881,530 B2
(45) Date of Patent: Nov. 11, 2014

(54) FUEL HEATING SYSTEM FOR STARTUP OF A COMBUSTION SYSTEM

(75) Inventors: Seyfettin Can Gulen, Schenectady, NY (US); Tailai Hu, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1070 days.

(21) Appl. No.: 12/875,072

(22) Filed: Sep. 2, 2010

(65) Prior Publication Data
US 2012/0055157 A1  Mar. 8, 2012

(51) Int. Cl.
| | |
|---|---|
| *F01K 3/12* | (2006.01) |
| *F02C 7/224* | (2006.01) |
| *F01K 3/16* | (2006.01) |
| *F02C 6/18* | (2006.01) |
| *F01K 23/06* | (2006.01) |
| *F01K 27/02* | (2006.01) |

(52) U.S. Cl.
CPC ... *F01K 3/12* (2013.01); *F01K 3/16* (2013.01); *F02C 6/18* (2013.01); *Y02E 10/46* (2013.01); *Y02E 20/16* (2013.01); *F01K 23/068* (2013.01); *F05D 2260/85* (2013.01); *F02C 7/224* (2013.01); *F01K 27/02* (2013.01); *Y02E 20/18* (2013.01)
USPC ......... 60/736; 60/39.182; 60/39.12; 60/641.8

(58) Field of Classification Search
CPC ....... F05D 2260/85; F01K 27/02; F01K 3/16; F01K 3/12; F01K 23/068; F02C 7/224; F02C 6/18; Y02E 10/46; Y02E 20/16; Y02D 20/18
USPC .......... 60/736, 39.182, 39.12, 641.8
See application file for complete search history.

(56) References Cited

U.S. PATENT DOCUMENTS

| | | | | |
|---|---|---|---|---|
| 3,974,642 | A | * | 8/1976 | Pacault ...................... 60/39.182 |
| 4,099,374 | A | * | 7/1978 | Foster-Pegg ................. 60/39.12 |
| 4,104,873 | A | | 8/1978 | Coffinberry |
| 4,354,345 | A | | 10/1982 | Dreisbach, Jr. et al. |
| 4,505,117 | A | * | 3/1985 | Matsuoka ........................ 60/609 |
| 4,741,152 | A | | 5/1988 | Burr et al. |
| 4,932,204 | A | * | 6/1990 | Pavel et al. ....................... 60/772 |
| 5,148,668 | A | | 9/1992 | Frutschi et al. |
| 5,255,505 | A | | 10/1993 | Cloyd et al. |
| 5,357,746 | A | | 10/1994 | Myers et al. |
| 5,444,972 | A | * | 8/1995 | Moore ....................... 60/39.182 |
| 5,457,951 | A | * | 10/1995 | Johnson et al. ................ 60/780 |
| 5,491,969 | A | | 2/1996 | Cohn et al. |
| 5,626,019 | A | * | 5/1997 | Shimizu et al. ................ 60/728 |
| 5,727,379 | A | * | 3/1998 | Cohn ....................... 60/39.182 |
| 5,826,430 | A | | 10/1998 | Little |
| 5,845,481 | A | | 12/1998 | Briesch et al. |
| 5,899,073 | A | * | 5/1999 | Akimaru ......................... 60/736 |

(Continued)

FOREIGN PATENT DOCUMENTS

| | | |
|---|---|---|
| CN | 1117751 A | 2/1996 |
| EP | 0959314 A2 | 11/1999 |

*Primary Examiner* — Phutthiwat Wongwian
*Assistant Examiner* — Carlos A Rivera
(74) *Attorney, Agent, or Firm* — Fletcher Yoder, P.C.

(57) ABSTRACT

A system may include an insulated water tank configured to store a first heated water from a first plant component during operation of a plant, and a fuel heater comprising a heat exchanger, wherein the heat exchanger is configured to transfer heat from the first heated water to a fuel for a gas turbine engine during startup of the plant.

19 Claims, 4 Drawing Sheets

(56) References Cited

U.S. PATENT DOCUMENTS

| | | |
|---|---|---|
| 6,065,280 A | 5/2000 | Ranasinghe et al. |
| 6,101,982 A | 8/2000 | Fischer et al. |
| 6,253,554 B1 | 7/2001 | Kobayashi et al. |
| 6,269,626 B1 | 8/2001 | Kim |
| 6,389,794 B2 | 5/2002 | Ranasinghe et al. |
| 6,389,797 B1 | 5/2002 | Sugishita et al. |
| 6,499,302 B1 | 12/2002 | Ranasinghe |
| 6,519,927 B2 * | 2/2003 | Liebig et al. ............... 60/39.182 |
| 6,560,966 B1 * | 5/2003 | Fetescu et al. .................. 60/775 |
| 6,920,760 B2 * | 7/2005 | Schottler et al. ................ 60/772 |
| 7,451,747 B2 * | 11/2008 | Hayashi et al. ............... 123/557 |
| 8,141,367 B2 * | 3/2012 | Rancruel et al. ............... 60/772 |
| 2006/0027216 A1 | 2/2006 | Hayashi et al. |
| 2008/0134658 A1 | 6/2008 | Yoshida |

\* cited by examiner

FUEL HEATING SYSTEM FOR STARTUP OF A COMBUSTION SYSTEM

BACKGROUND OF THE INVENTION

The subject matter disclosed herein relates to a fuel heating system, and more particularly, to heating fuel during startup of a gas turbine engine.

A gas turbine engine combusts a mixture of fuel and air to generate hot combustion gases, which drive rotation of one or more stage of turbine blades. In turn, the rotation may be used to drive a load, such as an electrical generator. During startup, it is desirable to rapidly bring the gas turbine engine to a load level where its exhaust emissions are in compliance with the pertinent regulations. The faster the gas turbine reaches this so-called "emissions-compliant" load level, the smaller is the total amount of harmful emissions. The rate of loading is dependent on the stable operation of the combustor of the gas turbine, which is primarily controlled by the fuel temperature. In modern gas turbines, during normal base load operation gaseous fuel is heated to improve the thermal efficiency. This heating is typically accomplished by the hot feed water extracted from the heat recovery steam generator (HRSG). Unfortunately, during a plant startup after a sufficiently long down time, the HRSG is not able to provide the hot water needed for gaseous fuel heating to a level required by stable combustor operation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an insulated water tank configured to store a first heated water from a first plant component during operation of a plant, and a fuel heater comprising a heat exchanger. The heat exchanger is configured to transfer heat from the first heated water to a fuel for a gas turbine engine during startup of the plant.

In a second embodiment, an apparatus includes a combustion system configured to combust a fuel, a first component configured to heat a first fluid with heat generated during operation of the combustion system, and an insulated tank configured to store the first fluid in a heated condition. The apparatus also includes a fuel heater with a heat exchanger configured to transfer heat from the first fluid stored in the insulated tank to the fuel during startup of the combustion system.

In a third embodiment, a system includes a fuel heating controller configured to enable a first flow of a first heated fluid from an insulated storage tank through a heat exchanger of a fuel heater during startup of a combustion system. The fuel heating controller is configured to enable a second flow of a second heated fluid through the heat exchanger of the fuel heater after startup of the combustion system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to a system for heating fuel during startup of a fuel-based system in a plant. For example, the disclosed embodiments may be used to heat fuel for a combustion system, such as a gas turbine engine, during startup of the combustion system and various plant equipment. Although the fuel heating system may have a variety of applications, the following discussion presents the fuel heating system in context of an integrated gasification combined cycle (IGCC) system or plant, which includes a gasifier, a gas treatment system, a gas turbine engine, a heat recovery steam generation (HRSG) system, a steam turbine, and various related plant equipment. During normal operation of the plant, the fuel heating system stores a heated fluid (e.g., water) in an insulated tank for later use as a heat source during startup. After shutdown, the plant and its various equipment cool down, thereby eliminating any potential heat sources for pre-heating the fuel other than the heated fluid stored in the insulated tank. Thus, during startup, the stored heated fluid provides sufficient thermal energy to heat the fuel for combustion until the plant is able to provide a self-sustaining heat source without the stored heated fluid. In some embodiments, the insulated tank may include an auxiliary heater configured to maintain the temperature above a threshold over an extended period of time, thereby reducing heat losses in the insulated tank.

Figure 1:
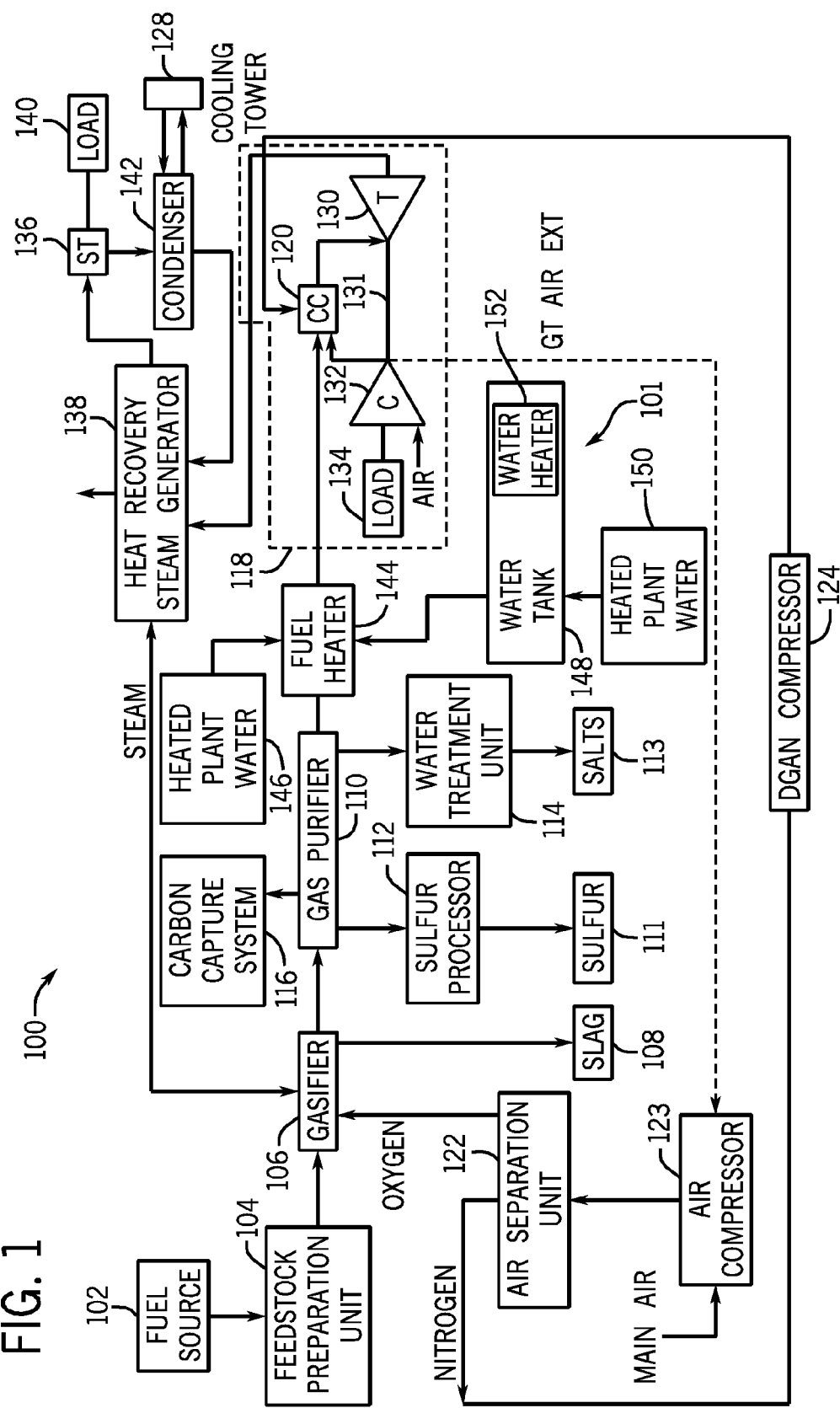
FIG. 1 is a schematic of an embodiment of an integrated gasification combined cycle (IGCC) power plant incorporating a system for heating fuel during startup.

FIG. 1 is a diagram of an embodiment of an integrated gasification combined cycle system 100 that may include the ability to preheat the fuel during startup of the IGCC system 100. As discussed in detail below, the IGCC system 100 includes a fuel heating system 101 configured to heat a fuel during both normal operation and startup of the IGCC system 100. For example, the fuel heating system 101 may include a fuel heater 144, which can transfer heat to a fuel to improve the performance of a gas turbine engine 118. In particular, the fuel heater 144 may transfer heat from a heated plant water 146 to the fuel during normal operation of the IGCC system 100, whereas the fuel heater 144 may transfer heat from a heated plant water 150 stored in a water tank 148 during startup of the IGCC system 100. The following discussion of the IGCC system 100 provides one possible context for the fuel heating system 101, although it is contemplated that embodiments of the fuel heating system 101 may be used in a variety of plants, facilities, and systems not limited to the IGCC system 100.

As illustrated in FIG. 1, the IGCC system 100 is configured to gasify a feedstock or fuel source 102, drive steam and gas turbines, and generate electricity. The fuel source 102 may include a variety of carbonaceous fuels, such as coal or hydrocarbons, in a solid or liquid form. A feedstock preparation unit 104 may be included to prepare the fuel for gasification, e.g., by milling, shredding, and pulverizing a solid form of the fuel source 102. However, the feedstock preparation unit 104 may be omitted if the fuel source 102 is in a liquid form.

The feedstock may be passed to a gasifier 106 from the feedstock preparation unit 104. The gasifier 106 may convert the feedstock into a syngas, e.g., a combination of carbon monoxide (CO) and hydrogen. This resultant gas may be termed untreated syngas, because it includes, for example, $H_2S$. The gasifier 106 may also generate waste, such as slag 108, which may be a wet ash material. A gas purifier 110 may be utilized to clean the untreated syngas. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a carbon capture system 116 may remove and process the carbonaceous gas (e.g., carbon dioxide that is approximately 80-100 or 90-100 percent pure by volume) included in the syngas. The treated syngas, which has undergone the removal of its sulfur containing components and a large fraction of its carbon dioxide, may be then transmitted to a combustor 120, e.g., a combustion chamber, of the gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. The drive shaft 131 may connect the turbine 130 to the compressor 132 to form a rotor. The compressor 132 may include blades coupled to the drive shaft 131. Thus, rotation of the turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

As mentioned above, in order to improve the efficiency of the gas turbine and the plant during normal operation, the fuel heating system 101 is configured to heat the fuel prior to combustion in the gas turbine engine 118. In the illustrated embodiment, the gas turbine engine 118 receives heated fuel during startup and during operation. The increased fuel temperature increases the total energy supplied by the fuel (i.e., fuel heating value and sensible heat) and reduces the amount of the fuel required for a given combustor exit temperature. Thus, for nearly the same gas turbine power output (slightly reduced due to lower fuel flow and ensuing lower turbine gas flow), less energy is consumed resulting in better efficiency. It should be noted that improved efficiency is also beneficial to total exhaust emissions by reducing the amount of combusted fuel for a given electric power output level. In fact, improving plant efficiency is the easiest way to reduce the harmful emissions from a power plant burning fossil fuels and, in the remainder of the discussion, improved efficiency should be understood to implicitly mean reduced emissions.

During normal operation, the gas turbine 118 receives heated fuel from fuel heater 144. The fuel heater 144 acts as a heat exchanger between heated plant water 146 and the fuel exiting the gas purifier 110. The energy to heat the heated plant water 146 may come from a variety of plant components, such as the gasifier 106, gas turbine engine 118, air separation unit 122, heat recovery steam generator 138, compressors 123 and 124, or the gas purifier 110. In this manner, heated water may be continuously generated during operation of the IGCC system 100. After shutdown, the IGCC system components cool and are no longer able to heat the plant water 146. Upon startup of the IGCC system 100, the plant water 146 may not be at a sufficient temperature to begin heating the fuel for the gas turbine 118. This is detrimental to the desire to start the gas turbine as fast as possible and bring it to an emissions-compliant load. This is due to the fact that the gas turbine combustor requires the fuel of a given composition and heating value to be at a certain temperature for stable operation. Customarily, this requirement is dictated by the "Modified Wobbe Index" (MWI), which is a relative measure of the energy input to the combustor at a fixed pressure ratio and determines the ability of the fuel conditioning and injection system to accommodate the variations in composition and heating value. There is an allowable range of MWI to ensure proper operation of the fuel injection system with the requisite fuel nozzle pressure ratios at all modes of operation, including startup. Thus, if the fuel temperature is so low that the variation in MWI is outside the allowable range, the gas turbine will take much longer time to arrive at the emissions-compliant load point while waiting to have sufficiently hot water from the HRSG (or other plant component) available for requisite fuel heating. This will have a significant adverse effect on total plant emissions.

To compensate for the system's lack of heated water 146 upon startup, the fuel heater 144 may receive heated water from an insulated water tank 148, which stores a sufficient amount of heated water during operation of the IGCC system 100. The heated water in the tank 148 is then used to heat the fuel until the IGCC system 100 is capable of providing a self-sustaining amount of heated water 146. For instance, it make take at least approximately 10, 20, 30, 60, or 90 minutes during startup to raise the temperature of the plant water 146 to a sufficient level to enable the system 100 to provide self-sustaining heated water 146 for the fuel heater 144. Thus, depending on the expected startup time, the water tank 148 may be sized to store a sufficient amount of heated plant water 150 to heat the IGCC system 100 for at least approximately 10, 20, 30, 60, 90 minutes or more.

The heated plant water 150, like the heated plant water 146, may come from a variety of plant components (e.g., gasifier, gas turbine, heat recovery steam generator, air separation unit, boiler etc.) during normal operation of the IGCC system 100. When the IGCC system shuts down, the heated plant water 150 remains within the water tank 148. The IGCC system 100 during startup then releases the heated water 150 to heat fuel in the fuel heater 144 until the system 100 can provide the necessary heated water 146 to heat the fuel. Occasionally, the time between shutdown and startup may be significant, allowing heated water 150 to decrease in temperature below a threshold temperature sufficient to heat the fuel upon startup. In these circumstances, a water heater 152 may be operated to maintain the temperature of the heated plant water 150 at or above the threshold temperature inside the water tank 148.

Figure 2:
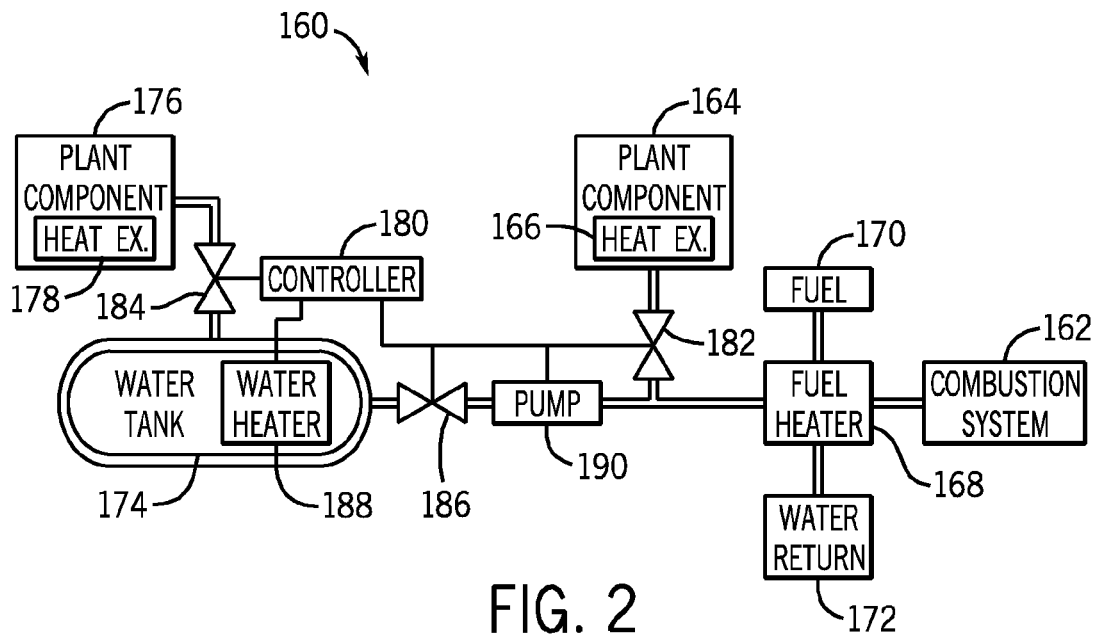
FIG. 2 is a schematic of an embodiment of a system for heating fuel during startup.

FIG. 2 is a block diagram of a water heating system 160 for heating fuel during normal operation and startup of a combustion system 162. Similar to the discussion above, the combustion system 162 (e.g., a gasifier, a gas turbine, a boiler, or a furnace) uses heated fuel to reduce fuel flow and improve efficiency. During normal plant operation, the heat to raise the fuel temperature for combustion comes from a heat transfer medium (e.g., water) heated by a plant component 164. For example, the plant component 164 may include a gasifier, a gas purifier or treatment system, an air separation unit (ASU), a compressor, a gas turbine, a boiler, a furnace, or any other source of heat. The plant component 164 uses a heat exchanger 166 to transfer heat to the heat transfer medium (e.g., water), which then flows through a fuel heater 168 to transfer heat to a fuel 170. In the present embodiment, the heat transfer medium is water, but it is understood that other embodiments may include a different fluid. The fuel 170 exiting the fuel heater 168 is a heated fuel (e.g., fuel at an elevated temperature), which substantially reduces the undesirable emissions during combustion of the fuel 170 in the combustion system 162. The water exiting the fuel heater 168 may then travel to a water return 172 for return to the plant component 164 to repeat the process.

When the plant component 164 is first started, it may not be capable of producing enough heated water in the heat exchanger 166. The system 160 addresses this problem by including an insulated water tank 174 that provides heated water for the fuel heater 168. For example, the insulated water tank 174 may be a metal enclosure with internal and/or external layers of thermal insulation, e.g., completely encapsulating a volume for storing the heated water. The water tank 174 includes a sufficient amount of heated water to heat the fuel 170 in the fuel heater 168 until the plant component 164 is able to provide a steady stream of heated water for the fuel heater 168. For example, the water tank 174 may include enough water to heat fuel 170 for at least approximately 10, 20, 30, 60, or 90 minutes or more depending on various parameters of the system. Thus, while the water tank 174 provides heated water for the fuel heater 168, the plant component 164 gradually heats water to a sufficient temperature for the fuel heater 168 to operate independently of the water tank 174. The water tank 174 receives heated water from a plant component 176, which may be the same as or different from the plant component 164 or combustion system 162. For instance, combustion system 162, plant component 164, and plant component 176 may all be the same. Thus, the combustion system 162 may provide the heated water to heat the fuel 170 in the fuel heater 168 during normal operation, while also heating water for the water tank 174 to be used during startup.

The controller 180 controls the flow of the heated water in the system during normal operation and during startup. For instance, the controller 180 shuts valves 182 and 184 and opens valve 186 during startup, thereby blocking the flow of cold water from the plant component 164 into the fuel heater 168 and the water tank 174, while enabling flow of the stored heated water from the water tank 174 to the fuel heater 168. Thus, the heated water in the water tank 174 is able to enter the fuel heater 168, where it heats fuel 170 for combustion in the combustion system 162. Once the plant component 164 is capable of heating water sufficiently to heat the fuel 170, the controller 180 then closes valve 186 and opens valve 182. With valve 182 now open, heated water from the plant component 164 is able to heat fuel 170 in the fuel heater 168. The controller 180 may simultaneously open valves 182 and 184 while closing valve 186. In this manner, heated water is able to heat the fuel 170 in the fuel heater 168, while replenishing the water tank 174 with heated water from the plant component 176. Alternatively, the controller 180 may open the valve 184 at another time during operation of the system 160. For instance, valve 184 may open shortly before shutdown of the system, e.g., at the end of the day.

In certain embodiments, the water tank 174 includes a water heater 188 to compensate for heat losses. Excessive heat losses may occur during long shutdown periods and/or if the water tank 174. Thus, water heater 188 is included to maintain the temperature of the water above a threshold temperature, or possibly to raise the temperature of the water. The controller 180 maintains control of the water heater 188 in response to one or more temperature sensors, which indicate when the water in the water tank 174 requires additional energy.

In certain embodiments, the system 160 includes a pump 190 to facilitate the circulation of the heated water from the tank 174 through the fuel heater 168. For example, the controller 180 may engage the pump 190 continuously during startup, or the controller 180 may engage the pump 190 after the water pressure in the water tank 174 falls below a threshold pressure. For example, after a percentage of the water in the tank 174 discharges and flows through the fuel heater 168, the controller 180 may trigger the pump 190 to increase the pressure to maintain a suitable flow of the water from the tank 174 through the fuel heater 168.

Figure 3:
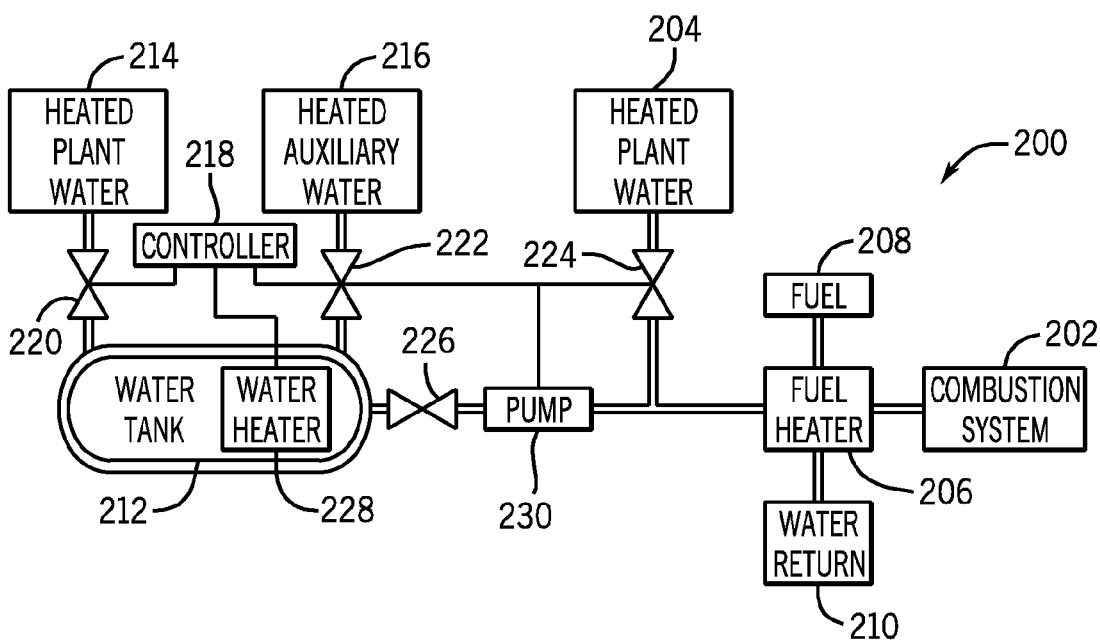
FIG. 3 is a schematic of an embodiment of a system for heating fuel during startup.

FIG. 3 is a block diagram of a water heating system 200 for heating fuel during normal operation and startup of a combustion system 202. Similar to the discussion above, the combustion system 202 (e.g., a gasifier, a gas turbine, a boiler, or a furnace) uses heated fuel to reduce fuel flow and improve efficiency. During normal plant operation, the heat to raise the fuel temperature for combustion comes from a heat transfer medium, e.g., a heated plant water 204. The heated plant water 204 flows through a fuel heater 206 to transfer heat to a fuel 208. In the present embodiment, the heat transfer medium is water, but it is understood that other embodiments may include a different fluid. The fuel 208 exiting the fuel heater 206 is a heated fuel (e.g., fuel at an elevated temperature), which substantially reduces the undesirable emissions during combustion of the fuel 208 in the combustion system 202. The water exiting the fuel heater 206 may then travel to a water return 210 for return to a process flow in the plant.

During startup of the combustion system 202, the plant water 204 may not be sufficiently heated to provide heating for the fuel 208. The system 200 addresses this problem by including an insulated water tank 212 that provides heated water for the fuel heater 206. For example, the insulated water tank 212 may be a metal enclosure with internal and/or external layers of thermal insulation, e.g., completely encapsulating a volume for storing the heated water. The water tank 212 includes a sufficient amount of heated water to heat the fuel 208 in the fuel heater 206 until the plant water 204 is sufficiently heated to pre-heat the fuel 208 without the water stored in the tank 212. For example, the water tank 212 may include enough water to heat fuel 208 for at least approximately 10, 20, 30, 60, or 90 minutes or more depending on various parameters of the system. Thus, while the water tank 212 provides heated water for the fuel heater 206, the plant water 204 gradually increases in temperature in response to increases in operating temperatures of the plant components and/or the combustion system 202. Eventually, the fuel heater 206 transfers heat to the fuel 208 from the heated plant water 204, rather than the water stored in the water tank 212. At this point or later, the water tank 212 may be replenished with heated plant water 214. The heated plant water 204 and 214 may be the same or different from one another. In either case, the heated plant water 204 and 214 may originate from a gasifier, a gas purifier or treatment system, an air separation unit (ASU), a compressor, a gas turbine, a boiler, a furnace, or any other source of heat. For example, the heated plant water 204 and 214 may originate from the combustion system 202. Thus, the combustion system 202 may provide the heated water to heat the fuel 208 in the fuel heater 206 during normal operation, while also heating water for the water tank 212 to be used during startup. Additionally or alternatively, the water tank 212 may receive heated auxiliary water 216 alone or in combination with the heated plant water 214. The heated auxiliary water 216 may originate from a variety of sources, such as an external solar thermal collector, a remote heat source, or an independent plant component.

The controller 218 controls the flow of the heated water in the system during normal operation and during startup. For instance, the controller 218 shuts valves 220, 222, and 224 and opens valve 226 during startup, thereby blocking the flow of cold water 214, 216, and 204 into the fuel heater 206 and the water tank 212, while enabling flow of the stored heated water from the water tank 212 to the fuel heater 206. Thus, the heated water in the water tank 212 is able to enter the fuel heater 206, where it heats fuel 208 for combustion in the combustion system 202. Once the plant water 204 is sufficiently elevated in temperature to heat the fuel 208, the controller 218 then closes valve 226 and opens valve 224. With valve 224 now open, the heated plant water 204 is able to heat fuel 208 in the fuel heater 206. The controller 218 may simultaneously open valves 220 and/or 222 while closing valve 226. In this manner, heated water 204 is able to heat the fuel 208 in the fuel heater 206, while heated water 214 and/or 216 replenishes the water tank 212 for subsequent use during another startup procedure. Alternatively, the controller 218 may open the valves 214 and/or 216 at another time during operation of the system 200. For instance, valves 214 and/or 216 may open shortly before shutdown of the system, e.g., at the end of the day.

In certain embodiments, the water tank 212 includes a water heater 228 to compensate for heat losses. Excessive heat losses may occur during long shutdown periods. Thus, water heater 228 is included to maintain the temperature of the water above a threshold temperature, or possibly to raise the temperature of the water. The controller 218 maintains control of the water heater 228 in response to one or more temperature sensors, which indicate when the water in the water tank 212 requires additional energy.

In certain embodiments, the system 200 includes a pump 230 to facilitate the circulation of the heated water from the tank 212 through the fuel heater 206. For example, the controller 218 may engage the pump 230 continuously during startup, or the controller 218 may engage the pump 230 after the water pressure in the water tank 212 falls below a threshold pressure. For example, after a percentage of the water in the tank 212 discharges and flows through the fuel heater 206, the controller 218 may trigger the pump 230 to increase the pressure to maintain a suitable flow of the water from the tank 212 through the fuel heater 206.

Figure 4:
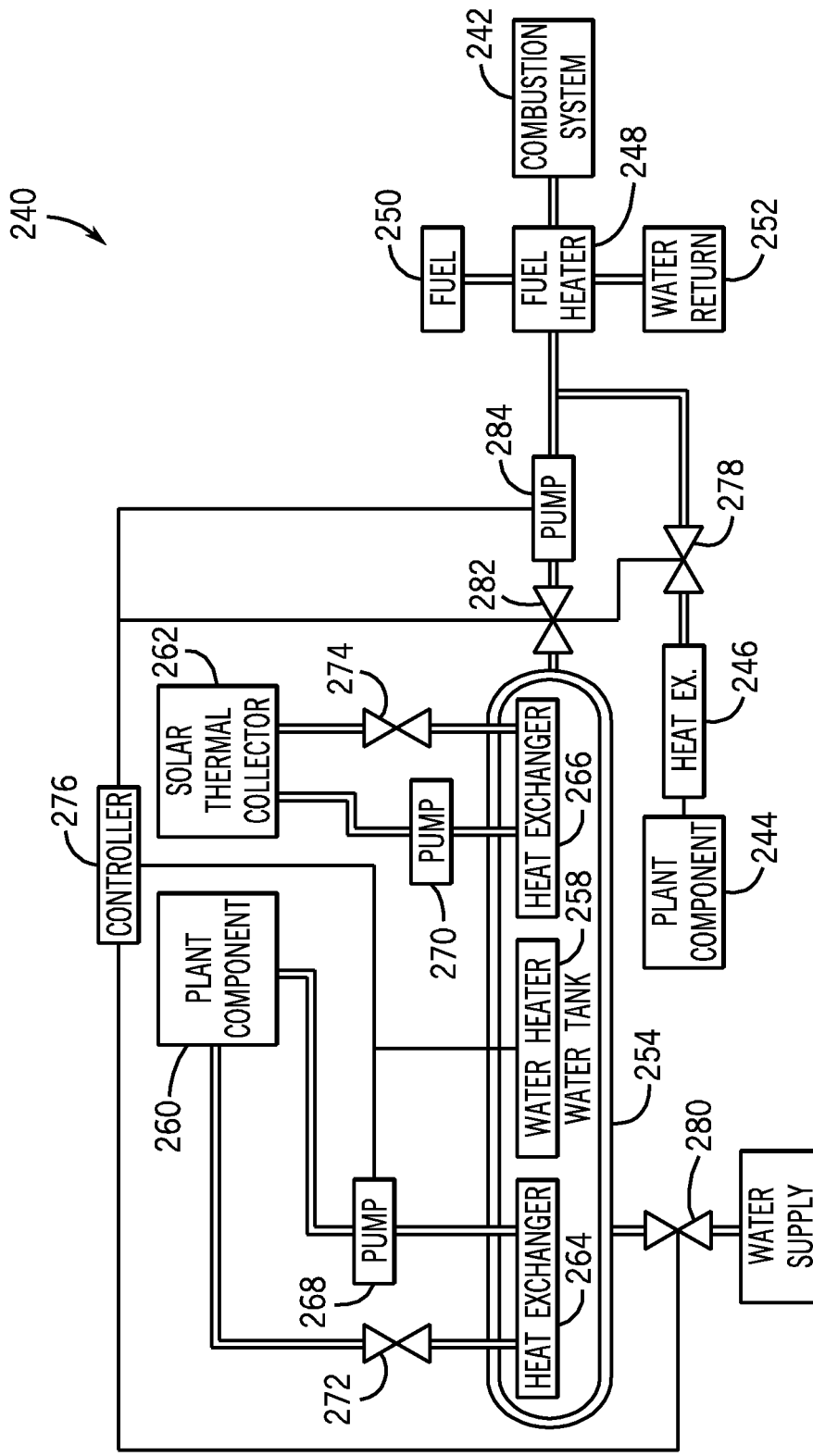
FIG. 4 is a schematic of an embodiment of a system for heating fuel during startup.

FIG. 4 is a block diagram of a water heating system 240 for heating fuel during normal operation and startup of a combustion system 242. Similar to the discussion above, the combustion system 242 (e.g., a gasifier, a gas turbine, a boiler, or a furnace) uses heated fuel to reduce fuel flow and improve efficiency. During normal plant operation, the heat to raise the fuel temperature for combustion comes from a heat transfer medium (e.g., water) heated by a plant component 244. For example, the plant component 244 may include a gasifier, a gas purifier or treatment system, an air separation unit (ASU), a compressor, a gas turbine, a boiler, a furnace, or any other source of heat. The plant component 244 uses a heat exchanger 246 to transfer heat to the heat transfer medium (e.g., water), which then flows through a fuel heater 248 to transfer heat to a fuel 250. In the present embodiment, the heat transfer medium is water, but it is understood that other embodiments may include a different fluid. The fuel 250 exiting the fuel heater 248 is a heated fuel (e.g., fuel at an elevated temperature), which is supplied to the combustion system 242. The water exiting the fuel heater 248 may then travel to a water return 252 for return to the plant component 244 to repeat the process.

When the plant component 244 is first started, it may not be capable of producing enough heated water in the heat exchanger 246. The system 240 addresses this problem by including an insulated water tank 254 that provides heated water for the fuel heater 248. For example, the insulated water tank 254 may be a metal enclosure with internal and/or external layers of thermal insulation, e.g., completely encapsulating a volume for storing the heated water. The water tank 254 includes a sufficient amount of heated water to heat the fuel 250 in the fuel heater 248 until the plant component 244 is able to provide a steady stream of heated water for the fuel heater 248. For example, the water tank 254 may include enough water to heat fuel 250 for at least approximately 10, 20, 30, 60, or 90 minutes or more depending on various parameters of the system. Thus, while the water tank 254 provides heated water for the fuel heater 248, the plant component 244 gradually heats water to a sufficient temperature for the fuel heater 248 to operate independently of the water tank 254.

In the illustrated embodiment, a water supply 256 provides water to the water tank 254, which includes a variety of heating systems to collectively or independently heat the water in the tank 254. For example, the heating systems may include a water heater 258 (e.g., an electric heating element) disposed in the water tank 254, a plant component 260 external to the water tank 254, and a solar thermal collector 262 external to the water tank 254. The plant component 260 and the solar thermal collector 262 may transfer heat to the water in the water tank 254 through respective heat exchangers 264 and 266. A working fluid moves the energy from the plant component 260 and the solar thermal collector 262 to the respective heat exchangers 264 and 266. Examples of possible working fluids may include water, oil, solvent, or other suitable heat exchange fluids. In some embodiments, pumps 268 and 270 operate with one-way valves 272 and 274 (e.g., check valves) to circulate the working fluids through the heat exchangers 264 and 266. In this way, the working fluid circulates between the plant component 260, the solar thermal collector 262, and their respective heat exchangers 264 and 266.

The controller 276 controls the flow of the heated water in the system during normal operation and during startup. For instance, the controller 276 opens valve 282 and closes valve 278 during startup, thereby blocking the flow of cold water from the plant component 244 into the fuel heater 248 and the water tank 254, while enabling flow of the stored heated water from the water tank 254 to the fuel heater 248. Thus, the heated water in the water tank 254 is able to enter the fuel heater 248, where it heats fuel 250 for combustion in the combustion system 242. In certain embodiments, the controller 276 may actuate the pump 284 while opening the valve 282 to maintain a sufficient flow of the heated water through the fuel heater 248. Once the heat exchanger 246 transfers sufficient heat from the plant component 244 to the water after startup, the controller 276 then closes valve 282 and opens valve 278. With valve 278 now open, heated water from the heat exchanger 246 is able to heat fuel 250 in the fuel heater 248. The controller 276 may simultaneously open valve 280, actuate pumps 268 and/or 270, and close valve 282 to replenish the water tank 254 with heated water. In particular, after sufficient water enters and fills the water tank 256, the plant component 260 and/or the solar thermal collector 262 may transfer heat to respective working fluids, which then circulate through the heat exchangers 264 and 266 to raise the temperature of the water in the tank 254. In certain embodiments, the water heater 258 may be used alone or in combination with the heat exchangers 264 and 266 to raise the temperature of the water in the tank 254. In other words, the water in the tank 254 may be heated with the heat exchanger 264 circulating a working fluid with the plant component 260, the heat exchanger 266 circulating a working fluid with the solar thermal collector 262, the water heater 258 in the tank 254, or any combination thereof.

In certain embodiments, the controller 276 may be configured to activate the pump 270 to collect heat from the solar thermal collector 262 during sunny weather or times of sufficient sunlight, whereas the controller 276 deactivates the pump 270 when the solar thermal collector 262 is unable to collect sufficient heat, e.g., during nighttime or times of insufficient sunlight (e.g., cloudy days). Similarly, the controller 276 may be configured to activate the pump 268 during periods of operation of the plant component 260 when sufficient heat is available to heat the water in the tank 254, whereas the controller 276 deactivates the pump 268 when the plant component 260 is not operating or lacks sufficient heat to elevate the temperature of the water in the tank 254. In either case, the respective pumps 268 and/or 270 continue circulating the working fluid until the controller 276 senses that the water has reached or exceed a threshold temperature. When the water reaches the threshold temperature, the controller 276 signals the pumps 268 and/or 270 to stop circulating the working fluid. After the water reaches the threshold temperature and the pumps 268 and 270 have been shutdown, the water heater 258 may be used to maintain the water temperature when the plant component 260 is not running and when the solar thermal collector 262 cannot provide energy (e.g., at night, cloudy days, etc.). In other words, the controller 276 may prioritize the heating systems to minimize energy consumption, e.g., first priority may be the solar thermal collector 262, second priority may be the plant component 260, and third priority may be the water heater 258. However, two or three of these heating systems may be used in combination to increase the speed of heating the water in the tank 254.

Figure 5:
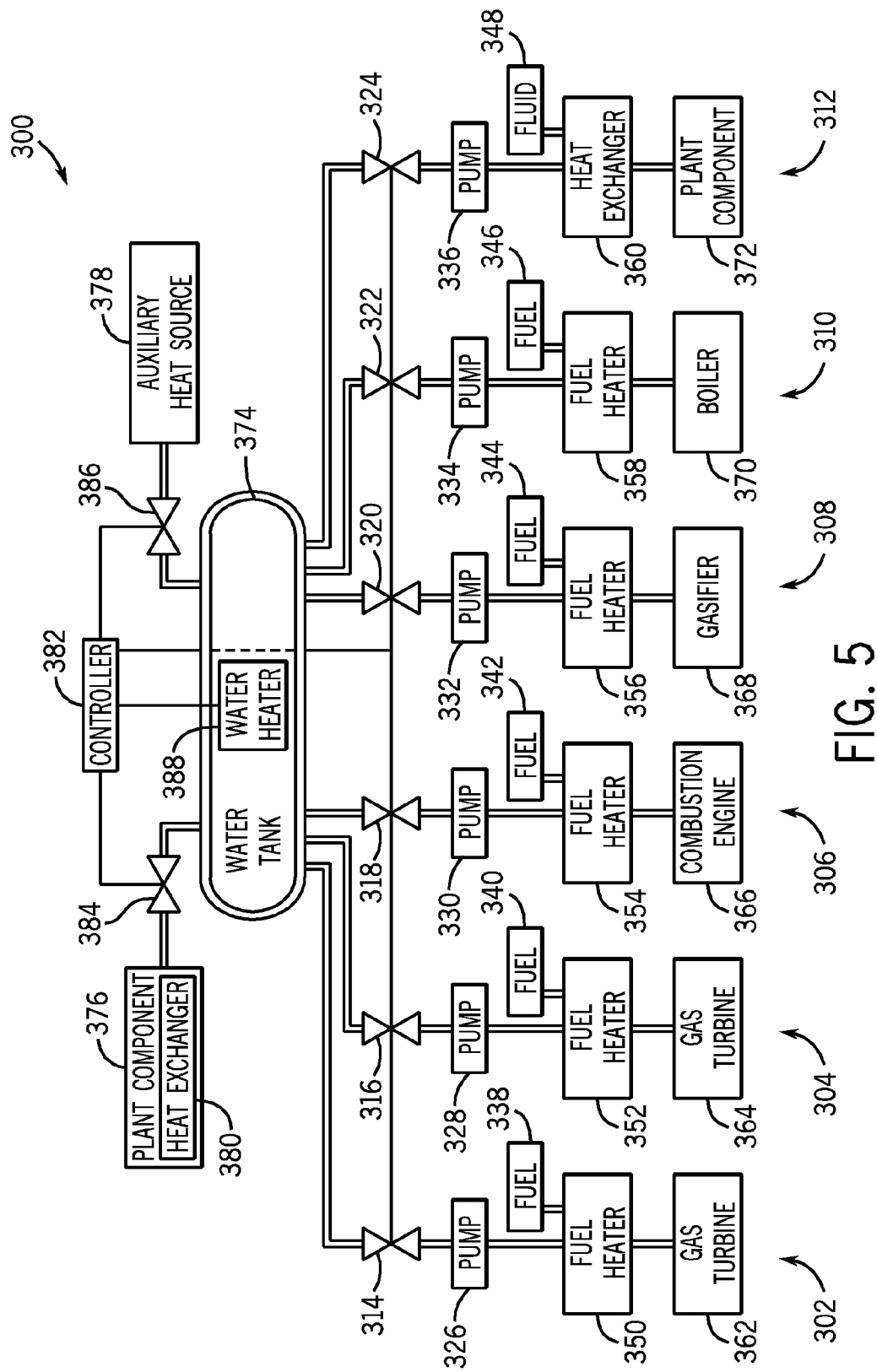
FIG. 5 is a schematic of an embodiment of a system for heating fuel during startup.

FIG. 5 is a block diagram of a fuel heating startup system 300 according to an embodiment. In the present embodiment, the fuel heating startup system 300 may heat fuel for different combustion subsystems 302, 304, 306, 308, 310, and 312. Each of these combustion subsystems 302-310 includes a respective valve 314, 316, 318, 320, 322, and 324. Each of these valves allows heated water to enter a respective combustion subsystem 302-310 for heating a fuel. The combustion subsystems 302-310 further include respective pumps 326, 328, 330, 332, 334, and 336 that move heated water in the subsystems 302-310. Each combustion subsystem 302-310 includes a fuel source 338, 340, 342, 344, 346, and 348. While in the present embodiments, there are separate fuel sources, each of the combustion subsystems 302-310 may receive fuel from the same fuel source. Each combustion subsystem 302-310 further includes fuel heaters 350, 352, 354, 356, 358, and 360, which transfer heat from the heated water to the fuel 338-360. In this manner, the fuel warms prior to combustion, improving efficiency and reducing emissions. Finally, each of the combustion subsystems 302-310 includes a combustion device that combusts the heated fuel. In the present embodiment, the combustion subsystems 302 and 304 include gas turbines 362 and 364; combustion subsystem 306 includes a combustion engine 366; combustion subsystem 308 includes a gasifier 308; combustion subsystem 310 includes a boiler; and combustion subsystem 312 includes another kind of plant component 372.

As explained above, heated water may not be available during startup, thus, an insulated water tank 374 may be included to store heated water. The water tank 374 stores heated water from a variety of sources, such as a plant component 376 and/or an auxiliary heat source 378. The plant component 376 may include one of the combustion devices 362-372, or any combination thereof. Furthermore, the plant component 376 may include a gas purifier or treatment system, a compressor, an air separation unit (ASU), or any combination thereof. The plant component 376 exchanges heat with water entering the water tank through heat exchanger 380. The auxiliary heat source 378 may provide heated water for the water tank 374 through a variety of sources, such as an external solar thermal collector, a remote heat source, or an independent plant component.

The controller 382 determines when heated water from the plant component 376 and/or auxiliary heat source 378 enters the tank by controlling valves 384 and 386. In this manner, the controller 382 determines whether to admit heated water from the plant component 376 and/or the auxiliary heat source 378, depending on the needs of the system 300 and the availability of heat. Once the water tank 374 fills with heated water, the controller 382 may close valves 384 and 386 until heated water is again needed in the water tank 374. When the combustion subsystems 302-312 start, the controller 382 opens the corresponding valve 314-324. The open valves 314-324 then allow water from the water tank 374 to heat fuel 338-348 in the corresponding fuel heater 350-360.

In certain embodiments, the water tank 374 includes a water heater 388 to compensate for heat losses. Excessive heat losses may occur during long shutdown periods and/or if the water tank 374. Thus, water heater 388 is included to maintain the temperature of the water above a threshold temperature, or possibly to raise the temperature of the water. The controller 382 maintains control of the water heater 388 in response to one or more temperature sensors, which indicate when the water in the water tank 374 requires additional energy.

Technical effects of the invention include the ability to pre-heat a fuel during startup of a combustion system (e.g., gas turbine, gasifier, boiler, etc.). Specifically, the disclosed embodiments store heat generated during operation of a plant or component, such that the heat is not wasted but rather is stored for later use during startup of the combustion system. In particular, the heat generated during operation is stored in a heat transfer medium, such as water, within an insulated storage tank. Thus, the storage of heat that would otherwise be wasted after shutdown is used during startup, thereby substantially reducing costs associated with fuel heating during startup. Furthermore, the stored heat may substantially increase the performance of fuel heating during startup, as the stored heat is readily available from the insulated storage tank.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an insulated water tank comprising a water heater disposed inside the insulated water tank, wherein the insulated water tank is configured to store a first heated water from a first plant component during operation of a plant, and the water heater is configured to heat the first heated water;
a fuel heater comprising a first heat exchanger, wherein the first heat exchanger is configured to transfer heat from the first heated water to a fuel for a second plant component during startup of the plant; and
a second heat exchanger, wherein the second heat exchanger is disposed inside the insulated water tank, and the second heat exchanger is configured to heat the first heated water within the insulated water tank with heat from a third plant component.

2. The system of claim 1, wherein the second plant component is a gas turbine engine.

3. The system of claim 2, wherein the first plant component comprises a heat recovery steam generation (HRSG) component.

4. The system of claim 2, wherein the first plant component comprises an integrated gasification combined cycle (IGCC) component.

5. The system of claim 2, wherein the first plant component comprises a solar thermal collector.

6. The system of claim 1, wherein the first heat exchanger is configured to transfer heat from a second heated water to the fuel after startup of the plant.

7. The system of claim 6, comprising a controller configured to transition from a first flow of the first heated water through the first heat exchanger during startup to a second flow of the second heated water through the first heat exchanger after startup.

8. The system of claim 6, wherein the second plant component is configured to supply the second heated water to the first heat exchanger.

9. The system of claim 8, wherein the second plant component does not route the second heated water through the insulated water tank.

10. A system, comprising:
a combustion system configured to combust a fuel;
a first component configured to heat a first fluid with heat generated during operation of the combustion system;
an insulated tank comprising a fluid heater disposed within the insulated tank in thermal communication with a second component, wherein the insulated tank is configured to store the first fluid in a heated condition;
a fuel heater comprising a heat exchanger configured to transfer heat from the first fluid stored in the insulated tank to the fuel during startup of the combustion system; and
a controller configured to control the fluid heater to heat the first fluid after shutdown of the combustion system to maintain the first fluid at or above a threshold level.

11. The system of claim 10, comprising the controller configured to transition from a first flow of the first fluid through the heat exchanger during startup to a second flow of a second fluid through the heat exchanger after startup, wherein the second fluid is heated with heat generated during operation of the combustion system.

12. The system of claim 10, wherein the first component is a part of the combustion system.

13. The system of claim 10, wherein the first component comprises an integrated gasification combined cycle (IGCC) plant component, a heat recovery steam generation (HRSG) component, a gasification component, a gas treatment component, or a combination thereof.

14. The system of claim 10, wherein the combustion system includes a gas turbine engine.

15. A system, comprising:
an insulated water tank;
a first heat exchanger disposed inside the insulated water tank configured to thermally communicate with an external heat source to heat water within the insulated water tank;
a water heater disposed inside the insulated water tank configured to heat the water within the insulated water tank;
at least one thermal sensor configured to detect a temperature of the water within the insulated water tank; and
a fuel heating controller configured to communicate with the at least one thermal sensor and to determine whether to heat the water in the insulated water tank with the external heat source through the first heat exchanger or with the water heater, and wherein the fuel heating controller is configured to enable a first flow of a first heated fluid from the insulated water tank through a second heat exchanger of a fuel heater during startup of a combustion system, and the fuel heating controller is configured to enable a second flow of a second heated fluid through the second heat exchanger of the fuel heater after startup of the combustion system.

16. The system of claim 15, comprising the combustion system having the fuel heating controller, wherein the fuel heating controller is configured to transition from the first flow through the second heat exchanger during startup to the second flow through the second heat exchanger after startup.

17. The system of claim 16, wherein the combustion system comprises a gas turbine engine.

18. The system of claim 1, wherein the first plant component is a gas turbine engine.

19. The system of claim 10, wherein the second component is not part of the combustion system.

* * * * *